United States Patent
Liu et al.

(10) Patent No.: US 7,139,590 B2
(45) Date of Patent: Nov. 21, 2006

(54) MOBILE APPARATUS CAPABLE OF AUTOMATIC DETECTION AND COMMUNICATION OF VOICE AND DIGITAL DATA

(75) Inventors: Wen-Shih Liu, Taipei (TW); Chen-Huang Fan, Miaoli (TW); Pei-Chang Hsu, Jubei (TW)

(73) Assignee: Benq Corporation, Taoyuan (TW)

( * ) Notice: Subject to any disclaimer, the term of this patent is extended or adjusted under 35 U.S.C. 154(b) by 419 days.

(21) Appl. No.: 10/262,685

(22) Filed: Oct. 1, 2002

(65) Prior Publication Data
US 2003/0144040 A1    Jul. 31, 2003

(30) Foreign Application Priority Data
Jan. 29, 2002    (TW) ............................... 91101451 A (51) Int. Cl.
*H04B 1/38* (2006.01)
*H04M 1/00* (2006.01)

(52) U.S. Cl. ................ 455/557; 455/569.1; 455/556.1; 455/90.3

(58) Field of Classification Search ................ 455/557, 455/569.1, 462, 556.1, 555, 556.2, 550.1, 455/575.6, 67.11, 90.3, 79, 74, 343.1, 343.3, 455/343.5
See application file for complete search history.

(56) References Cited

U.S. PATENT DOCUMENTS

| | | | | | |
|---|---|---|---|---|---|
| 5,282,238 | A | * | 1/1994 | Berland | 455/557 |
| 6,195,570 | B1 | * | 2/2001 | Ishida | 455/557 |
| 6,222,910 | B1 | * | 4/2001 | Price et al. | 379/93.37 |
| 6,373,791 | B1 | * | 4/2002 | Ukita et al. | 455/527 |
| 6,438,384 | B1 | * | 8/2002 | Chen | 455/557 |
| 6,519,475 | B1 | * | 2/2003 | Kim | 455/557 |
| 2002/0037746 | A1 | * | 3/2002 | Osano | 455/557 |

* cited by examiner

*Primary Examiner*—Edward F. Urban
*Assistant Examiner*—John J. Lee
(74) *Attorney, Agent, or Firm*—Ladas & Parry LLP (57) ABSTRACT

A mobile apparatus with automatic detection and communication of voice and digital data. The mobile apparatus has a voice module for processing a voice signal and communication means for serial transmission and reception of a digital data signal. Also, the mobile apparatus includes a connector, a processor and a selection unit. The connector has a first, second and third terminal used to receive and transmit a first, second and third signal respectively. The processor detects the third signal periodically and employs conversion means for converting the first signal into a voltage value to set a selection signal when the third signal is detected at a predetermined state. According to the selection signal, the selection unit establishes a first path between the connector and the communication means or establishes a second path between the connector and the voice module to pass the first and the second signals.

26 Claims, 8 Drawing Sheets

MOBILE APPARATUS CAPABLE OF AUTOMATIC DETECTION AND COMMUNICATION OF VOICE AND DIGITAL DATA

BACKGROUND OF THE INVENTION

1. Field of the Invention

The invention relates to a mobile apparatus capable of automatic detection and communication of voice and digital data. More particularly, the invention relates to a cellular phone that can detect the type of accessory plugged into its earphone jack and interchangeably communicate voice or digital data.

2. Description of the Related Art

Figure 1A:
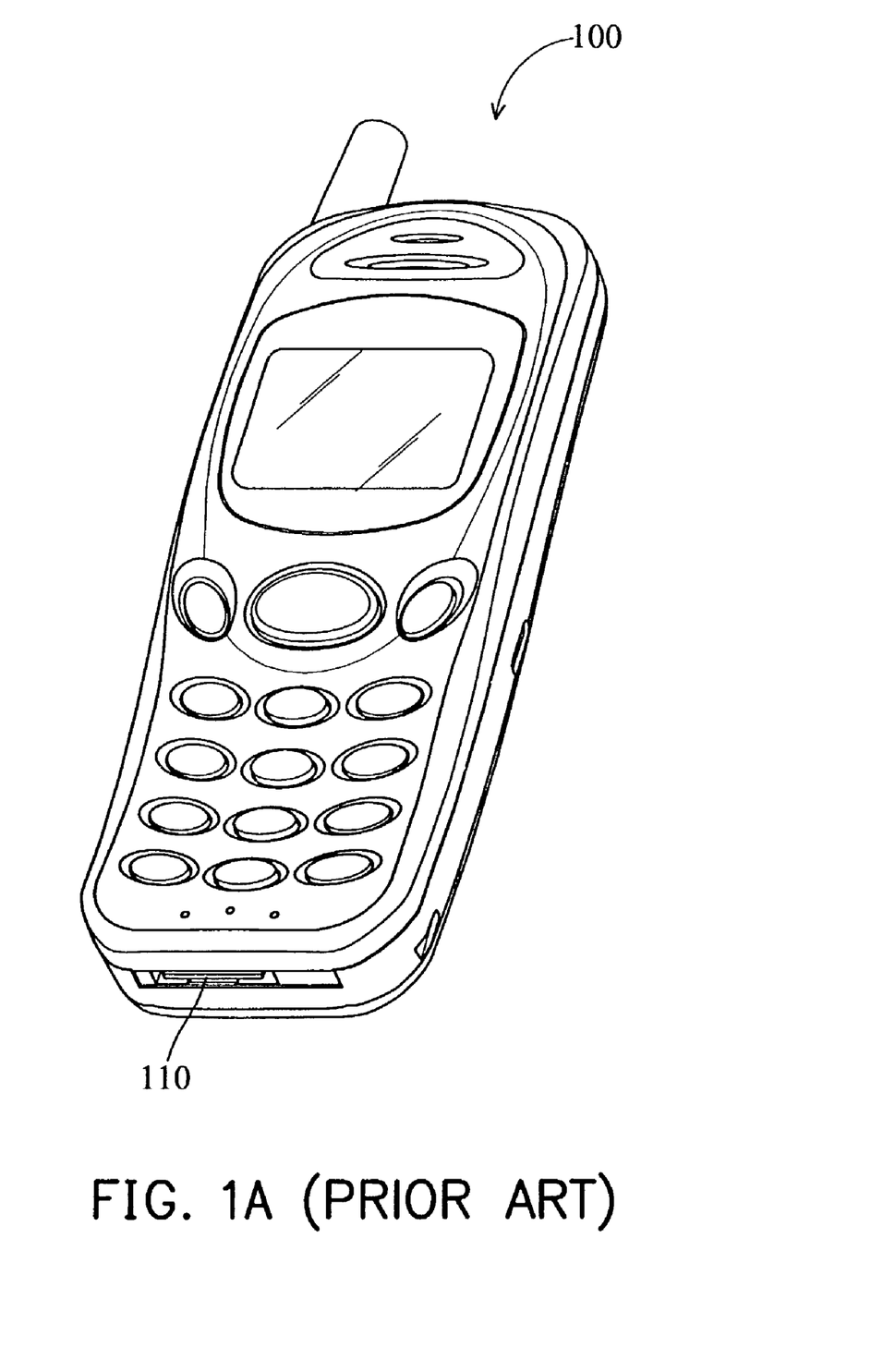
FIG. 1A is a diagram illustrating the appearance of a prior art cellular phone.
Figure 1B:
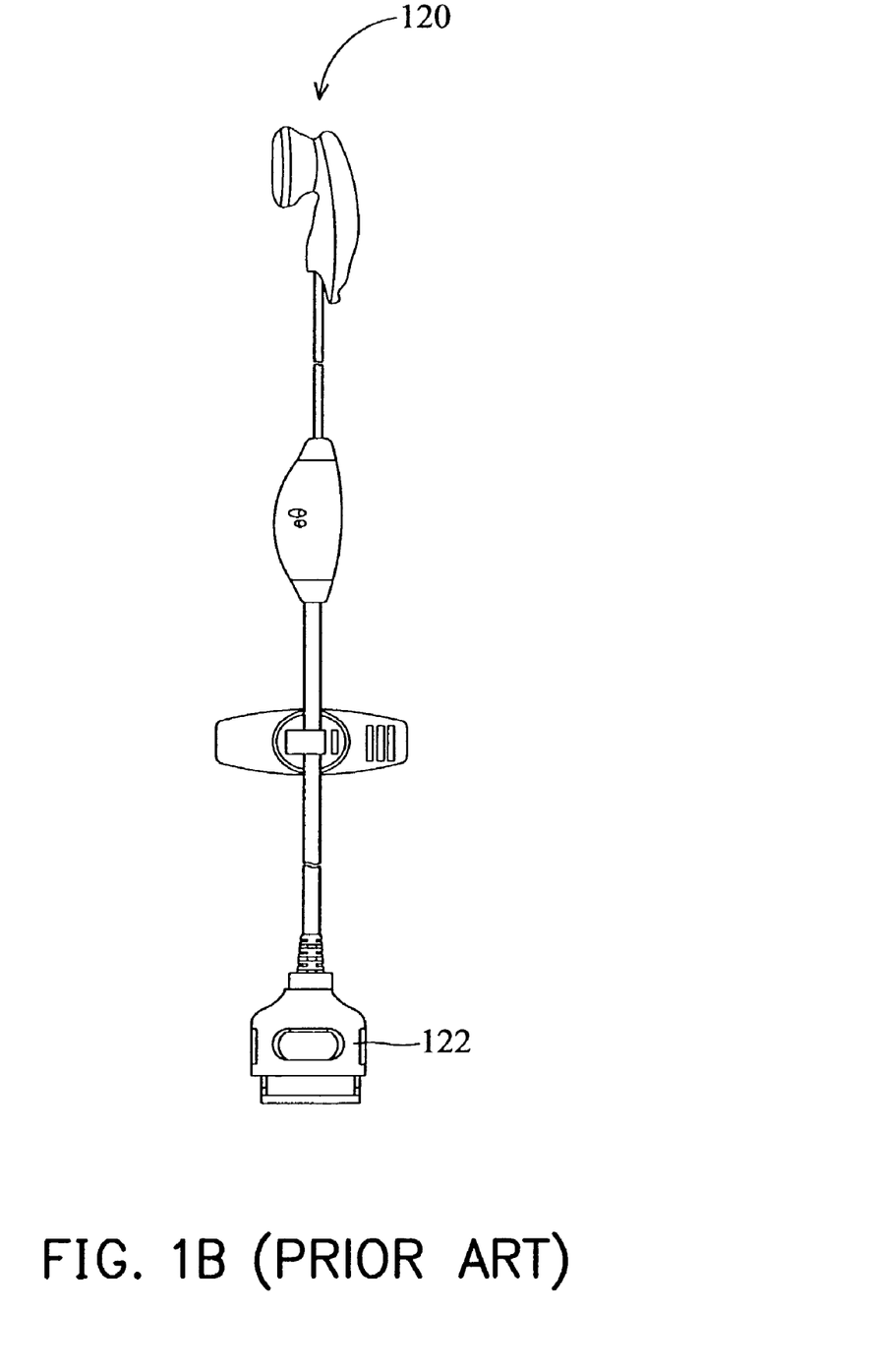
FIG. 1B is a diagram illustrating a conventional hands-free headset for an accessory connector on the prior art cellular phone.

Conventional mobile apparatus such as a cellular phone 100 in FIG. 1A may provide privacy and hands-free operation when a hands-free headset or earpiece microphone 120 in FIG. 1B is attached to an accessory connector 110 on the phone 100. With the hands-free headset 120, a user has the freedom to communicate while performing other activities. On the other hand, a data connectivity accessory 130 in FIG. 1C can be plugged into the accessory connector 110 on the cellular phone 100. The data connectivity accessory 130 connects such mobile apparatus to a computer (not shown), allowing a user to connect to the web, access e-mail and send or receive faxes through a wireless network connection.

Figure 1C:
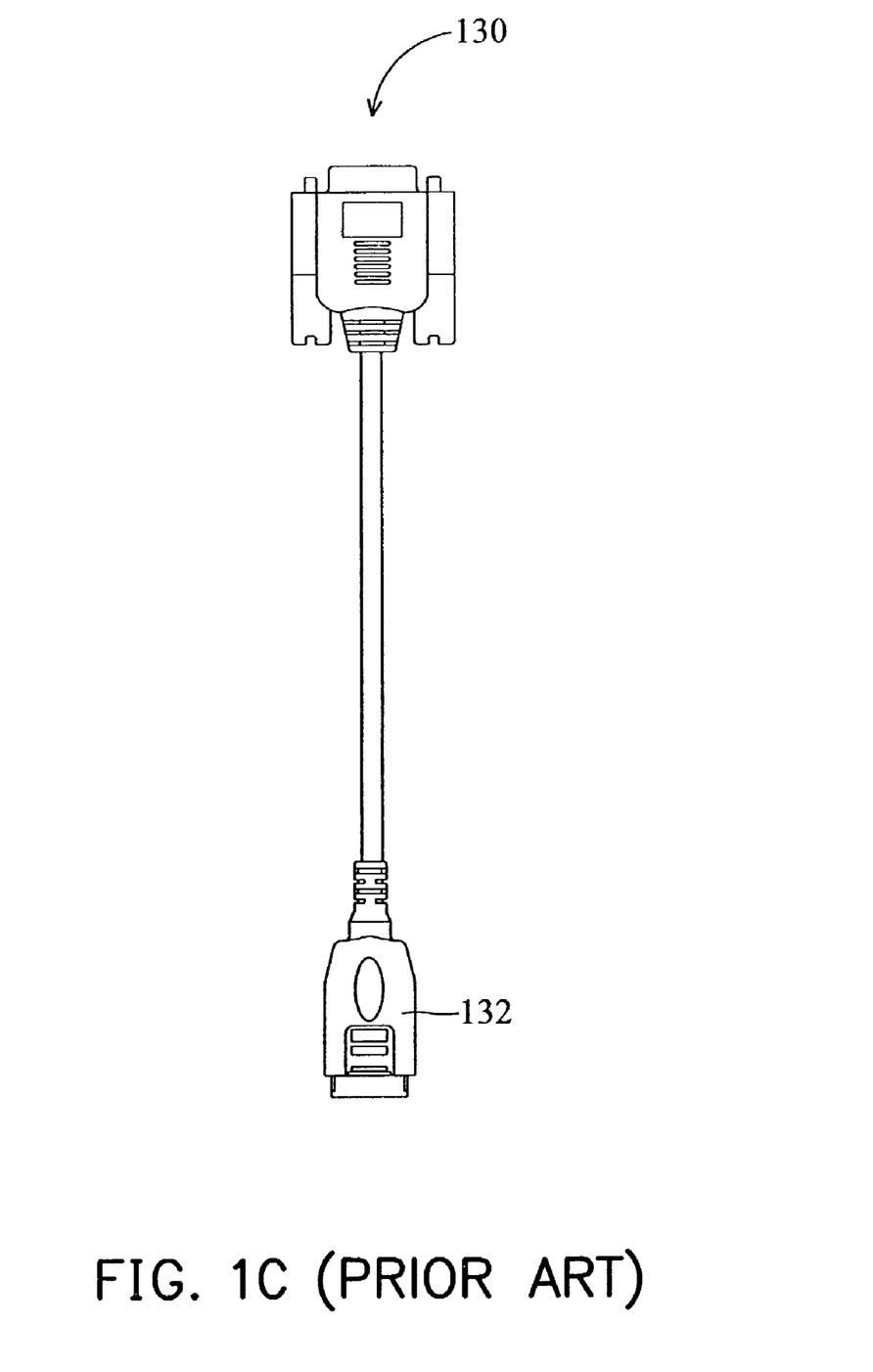
FIG. 1C is a diagram illustrating a conventional data connectivity accessory for the accessory connector on the prior art cellular phone.

Although the conventional mobile apparatus may utilize the accessory connector 110 to offer add-on features, the accessory connector 110 can take up considerable space on the cellular phone 100 and reduce its physical appeal. Moreover, since the cellular phone 100 must be equipped with the headset 120 and the data connectivity accessory 130 having the connector heads 122 and 132 to mate with the accessory connector 110, resulting in an increase in production cost. Accordingly, what is needed is a mobile apparatus designed with a simple and low-cost earphone jack rather than the conventional accessory connector 110, offering automatic detection and communication of voice and digital data.

SUMMARY OF THE INVENTION

It is an object of the present invention to provide a mobile apparatus capable of automatic detection and communication of voice and digital data, which is able to detect the type of accessory plugged into its earphone jack and to communicate voice and digital data without manual intervention.

It is another object of the present invention to provide a cellular phone having an earphone jack to connect accessories, such as voice and data connectivity accessories, with the corresponding earphone plug, thereby enhancing the appearance of the cellular phone and reducing its production cost.

The present invention is generally directed to a mobile apparatus capable of automatic detection of both voice and digital data, and subsequent communication according to the data detected. The mobile apparatus of the invention has a voice module for processing a voice signal and a communication means for serial transmission and reception of a digital data signal. Also, the mobile apparatus of the invention includes a connector, a processor and a selection unit. The connector has a first terminal for receiving a first signal, a second terminal for transmitting a second signal, and a third terminal for providing a third signal. The processor detects the third signal periodically. The processor further has a conversion means for converting the first signal into a voltage value when the third signal is detected at a predetermined state. Based on the voltage value, the processor sets a selection signal to a first state or a second state. The selection unit selectively establishes a first path or a second path to pass the first and the second signals in accordance with the selection signal. The first path connects the first and the second terminals of the connector with the communication means, and the second path connects the first and the second terminals of the connector with the voice module.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 2A:
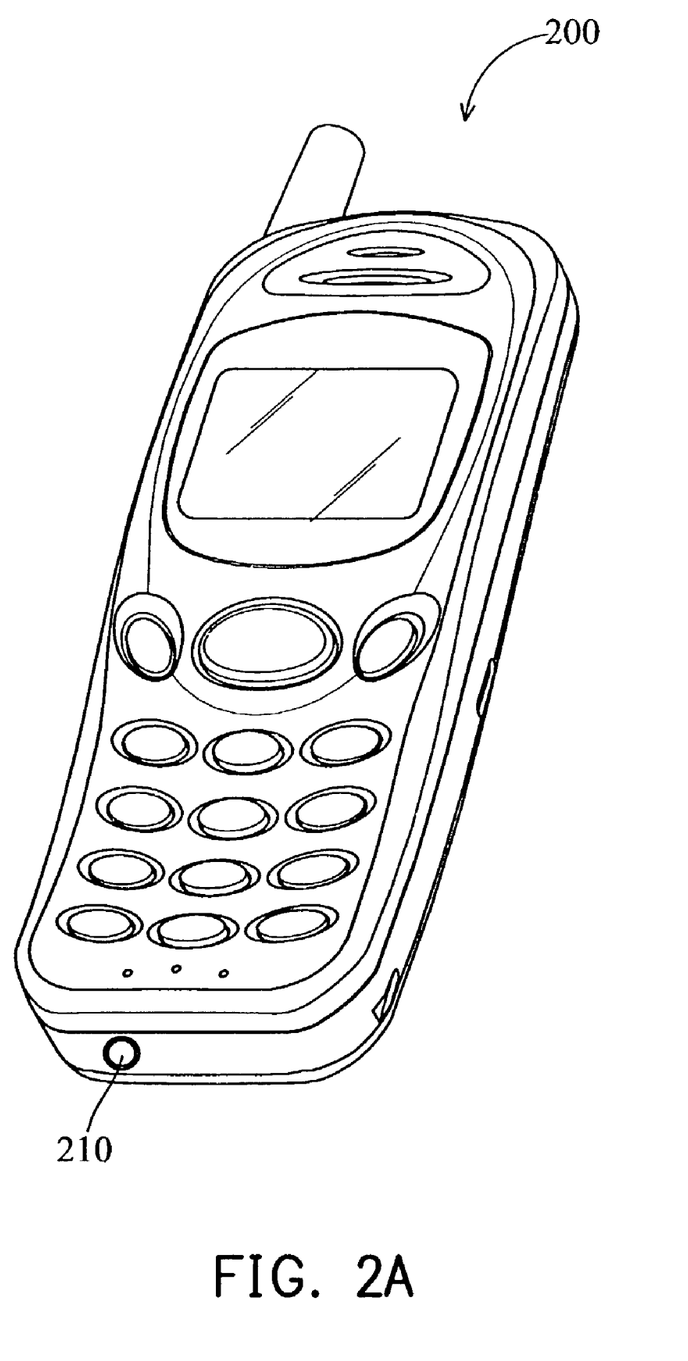
FIG. 2A is a diagram illustrating the appearance of a mobile apparatus according to the invention.
Figure 2B:
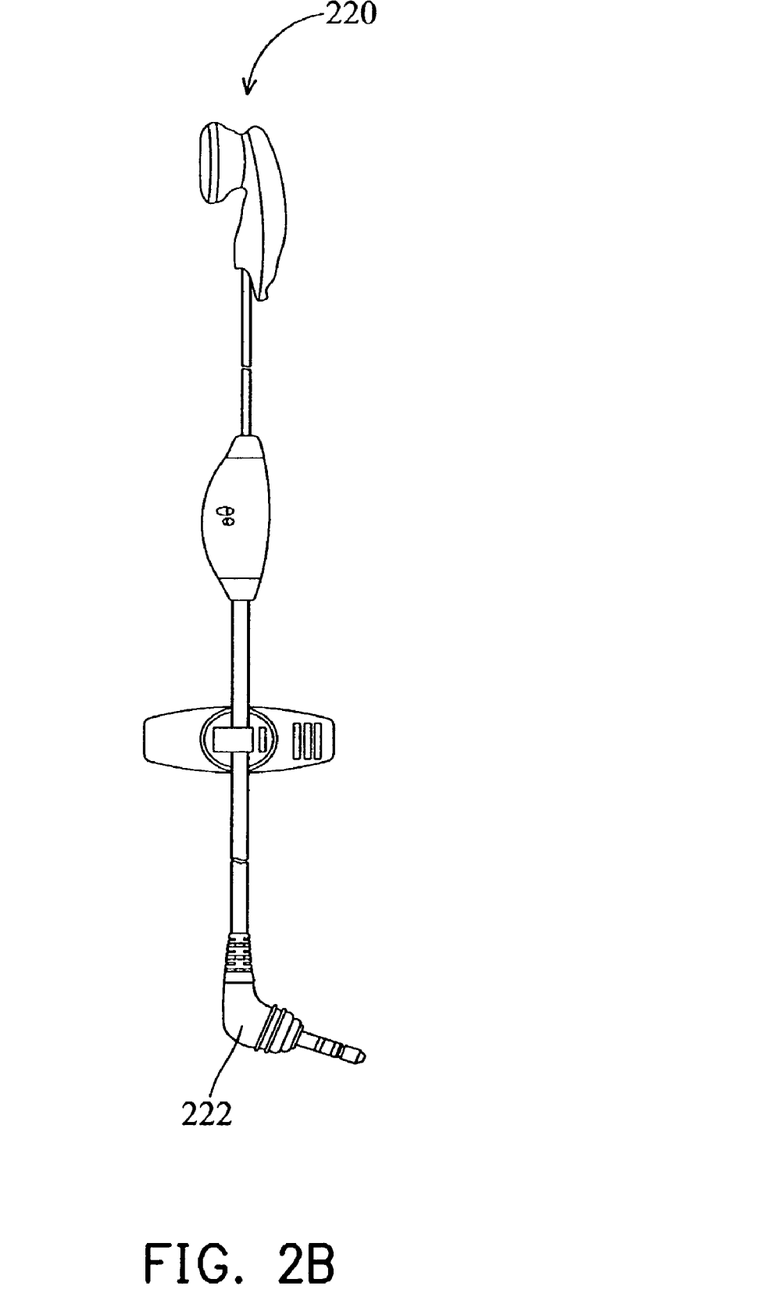
FIG. 2B is a diagram illustrating a hands-free headset of the invention.
Figure 2C:
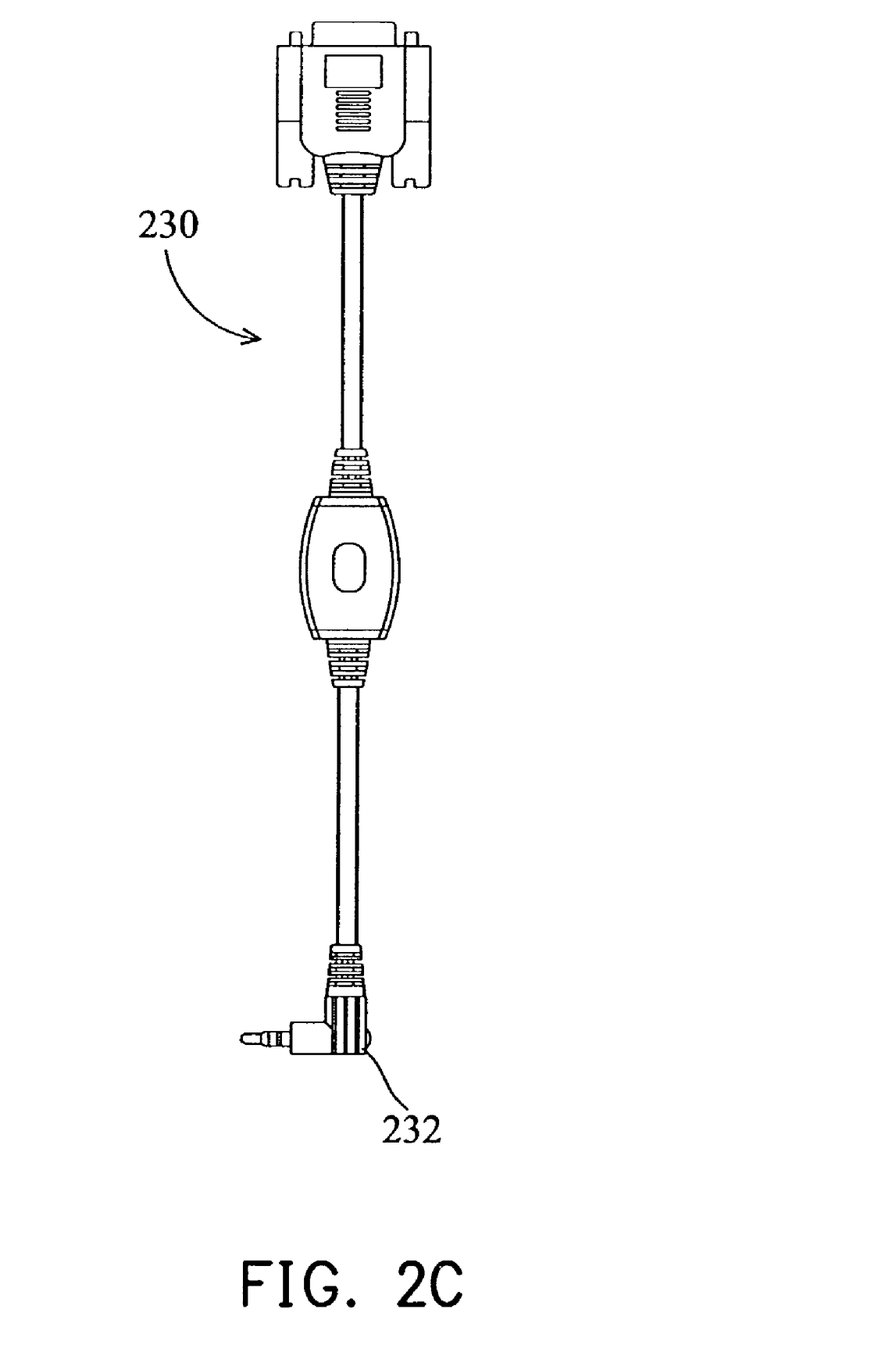
FIG. 2C is a diagram illustrating a data connectivity accessory of the invention.

Referring to FIG. 2A, a mobile apparatus of the invention such as a cellular phone 200 has an opening on its cover for an industry standard 2.5 mm earphone jack 210. Compared to the conventional accessory connector 110, it is preferable to design the cellular phone 200 integrating the earphone jack 210. To mate with the earphone jack 210, accessories of the invention must have a corresponding earphone plug for the earphone jack 210. A hands-free headset (or earpiece microphone) 220 of the invention as well as its plug 222 and a data connectivity accessory 230 of the invention as well as its plug 232 are illustrated in FIGS. 2B and 2C, respectively. According to the invention, the cellular phone 200 employs the earphone jack and plug, thereby reducing its production cost.

Figure 3A:
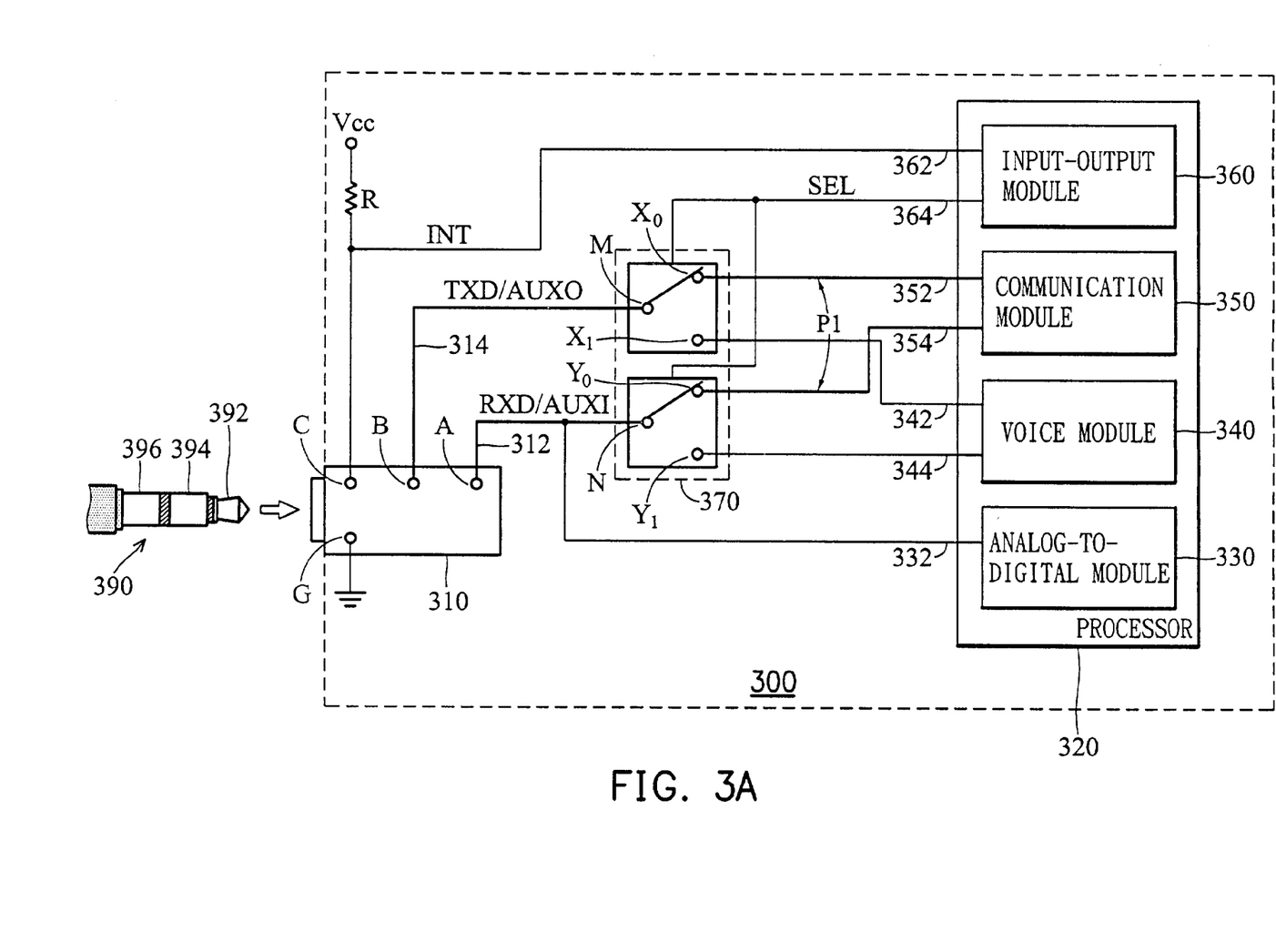
FIG. 3A is a preferred embodiment and a first path thereon according to the invention.

With a distinguishing characteristic between voice signals and digital data signals, the cellular phone 200 can detect the type of accessory plugged into its earphone jack 210 to communicate voice or digital data automatically. FIG. 3A is a preferred embodiment illustrating a circuit 300 of the invention, which includes a connector 310, a processor 320 and a selection unit 370 representative of an analog switch. Preferably, the connector 310 is an earphone jack with three terminals. The processor 320 comprises an analog-to-digital module 330, a voice module 340, a communication module 350 and an input-output module 360. It should be understood by those skilled in the art that the processor 320 may not incorporate all of these four modules, but they may be implemented independent of the processor 320. The voice module 340 is used to process a voice signal, and the communication module is used to serially transmit and receive a digital data signal.

A terminal C of the earphone jack 310 is coupled to a system power source Vcc of the circuit 300 by way of a resistor R. Consequently, the terminal C of the earphone jack 310 provides a third signal INT of logic '1' via a line 362 to the input-output module 360 when the earphone jack 310 does not receive an accessory plug. When an accessory plug 390 is inserted into the earphone jack 310 as shown in FIG. 3A, a first portion 392 of the accessory plug 390 and a terminal A of the earphone jack 310 receiving a first signal RXD/AUXI form a first electrical contact to allow the circuit 300 of the cellular phone 200 to receive the first signal RXD/AUXI from the accessory. Similarly, a second portion 394 of the accessory plug 390 and a terminal B of the earphone jack 310 transmitting a second signal TXD/AUXO form a second electrical contact to allow the circuit 300 of the cellular phone 200 to transmit the second signal TXD/AUXO to the accessory. In addition, a third portion 396 of the accessory plug 390, the terminal C of the earphone jack 310 and ground G form a third electrical contact to pull down the third signal INT to the ground (e.g., logic '0').

The processor 320 is used to detect the third signal INT periodically. When the accessory plug 390 is inserted into the earphone jack 310, the processor 320 can detect the third signal becoming a logic '0'. Then, the analog-to-digital module 330 receives the first signal RXD/AUXI via a line 332 and converts it into a voltage value. According to the voltage value, the processor 320 sets a selection signal SEL. The voltage value obtained from the analog-to-digital module 330 should range between 0.4 Vcc and 0.85 Vcc (i.e., 40%~85% of the Vcc) due to the design characteristic of a voice accessory such as the headset 220. In one embodiment, a threshold voltage is set to 0.9 Vcc (i.e., 90% of the Vcc). If the voltage value obtained from the analog-to-digital module 330 exceeds the threshold voltage of 0.9Vcc, it indicates that the inserted accessory is the data connectivity accessory 230. If the voltage value is below the threshold voltage, it indicates that the inserted accessory is the hands-free headset 220.

Still referring to FIG. 3A, when the voltage value exceeds the threshold voltage, the processor 320 determines that the data connectivity accessory 230 is plugged into the earphone jack 310. Thus, the processor 320 instructs the input-output module 360 to set the selection signal SEL to a first state (logic '0') and to provide the selection signal SEL to the selection unit 370 via a line 364. According to the selection signal SEL, the selection unit 370 establishes a first path Pi between the terminals A, B of the earphone jack 310 and the communication module 350 to pass the first signal RXD and the second signal TXD. As a result, terminals M and $X_0$ of the selection unit 370 are coupled together allowing a line 314 connected with a line 352. Terminals M and $Y_0$ of the selection unit 370 are also coupled together allowing a line 312 connected with a line 354. Thus, the communication module 350 can transmit and receive digital data to and from the data connectivity accessory 230. With the data connectivity accessory 230 and the mobile apparatus 200 of the invention, a computer or information device may access the Internet through a mobile network connection. It is appreciated that the mobile apparatus 200 may have application software to update its firmware and to synchronize data with a computer in the above-described manner.

Figure 3B:
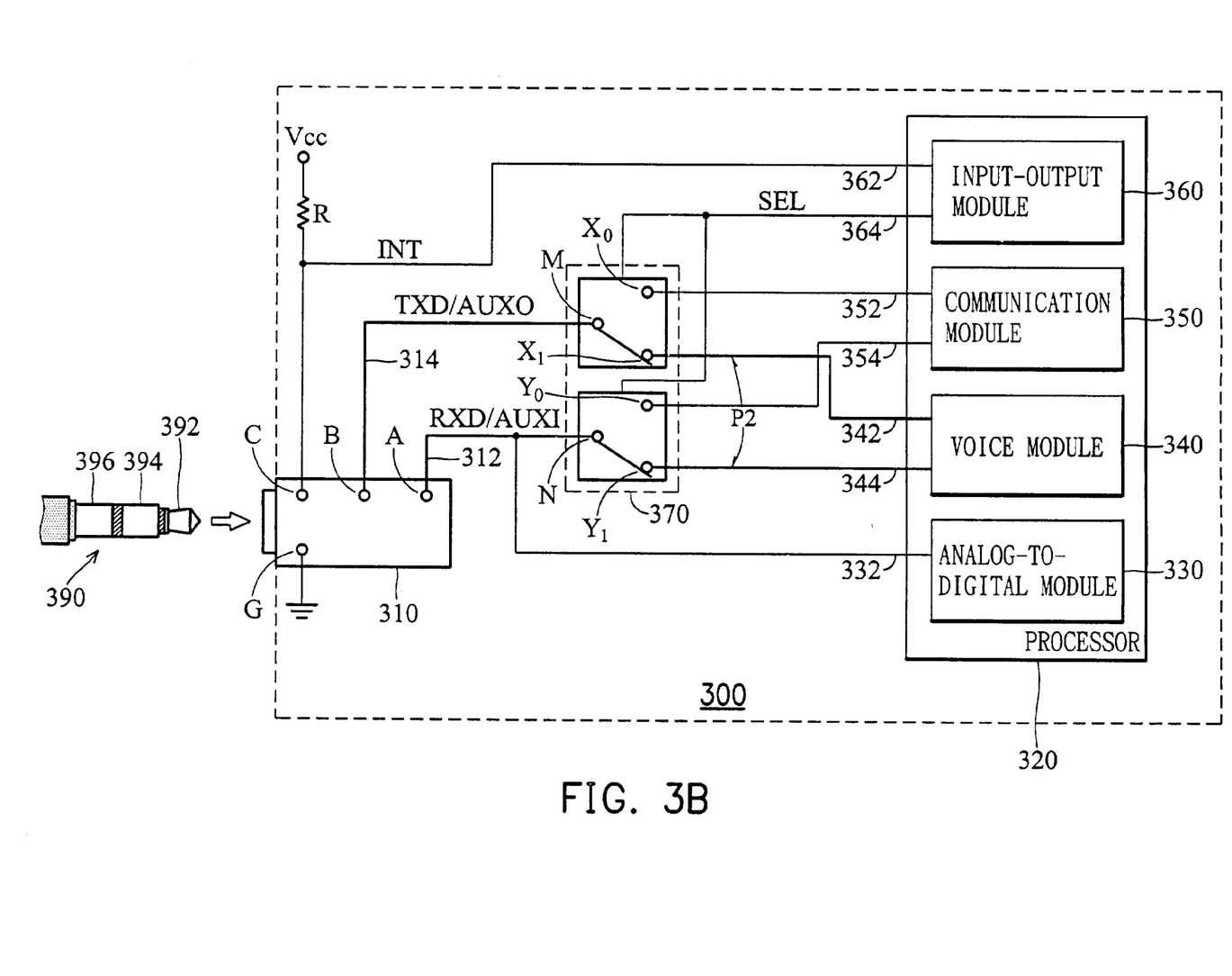
FIG. 3B is the preferred embodiment of FIG. 3A and a second path thereon according to the invention.

Turning now to FIG. 3B, when the voltage value obtained from the analog-to-digital module 330 is below the threshold voltage, the processor 320 determines that a voice accessory such as the headset 220 is plugged into the earphone jack 310. Thus, the processor 320 instructs the input-output module 360 to set the selection signal SEL to a second state (logic '1') and to provide the selection signal SEL to the selection unit 370 via the line 364. According to the selection signal SEL, the selection unit 370 establishes a second path P2 between the terminals A, B of the earphone jack 310 and the voice module 340 to pass the first signal RXD and the second signal TXD. Consequently, terminals M and $X_1$ of the selection unit 370 are coupled together allowing the line 314 to connect with a line 342. Terminals M and $Y_1$ of the selection unit 370 are also coupled together allowing the line 312 to connect with a line 314. In this way, the voice module 340 can transmit and receive the voice signal to and from the headset 220. Accordingly, the mobile apparatus 200 can detect the type of accessory plugged into its earphone jack 310 and to communicate voice and digital data without manual intervention. With the headset 220 of the invention, a user has the freedom to communicate while performing other activities.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mobile apparatus capable of automatic detection of both voice and digital data, and communication according to the data detected, comprising:
   a communication means for processing digital data;
   a voice module for processing voice data;
   a connector comprising a first terminal for receiving a first signal and a second terminal for transmitting a second signal;
   a processor coupled to the first terminal for generating a selection signal according to a voltage value of the first signal; and
   a selection unit, responsive to the selection signal, for selectively establishing one of a first path and a second path, the first path coupling the first and the second terminals to the communication means, and the second path coupling the first and the second terminals to the voice module;
   wherein the processor further comprises a conversion means, and the voltage value converted from the first signal by the conversion means exceeds a threshold voltage when a data connectivity accessory is inserted into the connector.

2. The mobile apparatus as recited in claim 1 wherein the connector further comprises a third terminal for providing a third signal, the processor reacts to the voltage value of the first signal when the third signal is detected at a predetermined state.

3. The mobile apparatus as recited in claim 2 wherein the third terminal provides the third signal at the predetermined state when a data connectivity accessory is inserted into the connector.

4. The mobile apparatus as recited in claim 2 wherein the third terminal of the connector provides the third signal at the predetermined state when a voice accessory is inserted into the connector.

5. The mobile apparatus as recited in claim 4 wherein the processor further comprises a conversion means, and the voltage value convened from the first signal by the conversion means is below a threshold voltage when the voice accessory is inserted into the connector.

6. The mobile apparatus as recited in claim 5 wherein the processor sets the selection signal to a second state to allow the selection unit to establish the second path when the voltage value is below the threshold voltage to indicate that the first signal received is the voice data.

7. The mobile apparatus as recited in claim 6 wherein the voice module respectively transmits and receives the first and the second signals via the second path when the selection unit establishes the second path between the first and the second terminals and the voice module.

8. The mobile apparatus as recited in claim 2 wherein the connector is an earphone jack.

9. The mobile apparatus as recited in claim 1 wherein the processor sets the selection signal to a first state to allow the selection unit to establish the first path when the voltage value exceeds the threshold voltage to indicate that the first signal received is the digital data.

10. The mobile apparatus as recited in claim 9 wherein the communication means respectively transmits and receives the first and the second signals via the first path when the selection unit establishes the first path between the first and the second terminals and the communication means.

11. A cellular phone comprising:
an earphone jack having a first terminal for receiving a first signal, a second terminal for transmitting a second signal, and a third terminal for providing a third signal;
a processor comprising:
a communication module for serial transmission and reception of a digital data signal;
a voice module for processing a voice signal;
an analog-to-digital module for converting the first signal into a voltage value; and
an input-output module for receiving the third signal and providing a selection signal;
wherein the input-output module detects the third signal periodically and sets the selection signal according to the voltage value, and the analog-to-digital module is enabled to convert the first signal into the voltage value when the third signal is detected at a predetermined state; and
a selection unit, responsive to the selection signal, for selectively establishing a first path between the first and the second terminals of the earphone jack and the communication module or a second path between the first and the second terminals of the earphone jack and the voice module to pass the first and the second signals.

12. The cellular phone as recited in claim 11 wherein the third terminal of the earphone jack provides the third signal at the predetermined state that is equal to a logic '0' when a data connectivity accessory is inserted into the earphone jack.

13. The cellular phone as recited in claim 12 wherein the voltage value converted by the analog-to-digital module exceeds a threshold voltage if the data connectivity accessory is inserted into the earphone jack.

14. The cellular phone as recited in claim 13 wherein the input-output module of the processor sets the selection signal to a first state to allow the selection unit to establish the first path when the voltage value exceeds the threshold voltage to indicate that the first signal received from the earphone jack is the digital data signal.

15. The cellular phone as recited in claim 14 wherein the communication module of the processor respectively transmits and receives the first and the second signals via the first path when the selection unit establishes the first path between the first and the second terminals of the earphone jack and the communication module.

16. The cellular phone as recited in claim 11 wherein the third terminal of the earphone jack provides the third signal at the predetermined state that is equal to a logic '0' when a voice accessory is inserted into the earphone jack.

17. The cellular phone as recited in claim 16 wherein the voltage value converted by the analog-to-digital module is below a threshold voltage if the voice accessory is inserted into the earphone jack.

18. The cellular phone as recited in claim 17 wherein the input-output module of the processor sets the selection signal to a second state to allow the selection unit to establish the second path when the voltage value is below the threshold voltage to indicate that the first signal received from the earphone jack is the voice signal.

19. The cellular phone as recited in claim 18 wherein the voice module of the processor respectively transmits and receives the first and the second signals via the second path when the selection unit establishes the second path between the first and the second terminals of the earphone jack and the voice module.

20. The cellular phone as recited in claim 11 wherein the selection unit is an analog switch.

21. A mobile apparatus capable of automatic detection of both voice and digital data, and communication according to the data detected, comprising:
a communication means for processing digital data;
a voice module for processing voice data;
a connector comprising a first terminal for receiving a first signal, a second terminal for transmitting a second signal, and a third terminal for providing a third signal wherein the third signal is provided at a predetermined state when a data connectivity accessory is inserted into the connector;
a processor coupled to the first terminal, comprising a conversion means, and generating a selection signal according to a voltage value of the first signal when the third signal is detected at the predetermined state, wherein the voltage value converted from the first signal by the conversion means exceeds a threshold voltage when the data connectivity accessory is inserted into the connector; and
a selection unit, responsive to the selection signal, for selectively establishing one of a first path and a second path, the first path coupling the first and the second terminals to the communication means, and the second path coupling the first and the second terminals to the voice module.

22. The mobile apparatus as recited in claim 21 wherein the processor sets the selection signal to a first state to allow the selection unit to establish the first path when the voltage value exceeds the threshold voltage to indicate that the first signal received is the digital data.

23. The mobile apparatus as recited in claim 22 wherein the communication means respectively transmits and receives the first and the second signals via the first path when the selection unit establishes the first path between the first and the second terminals and the communication means.

24. A mobile apparatus capable of automatic detection of both voice and digital data, and communication according to the data detected, comprising:
a communication means for processing digital data;
a voice module for processing voice data;

a connector comprising a first terminal for receiving a first signal, a second terminal for transmitting a second signal, and a third terminal for providing a third signal wherein the third signal is provided at a predetermined state when a voice accessory is inserted into the connector;

a processor coupled to the first terminal, comprising a conversion means, and generating a selection signal according to a voltage value of the first signal when the third signal is detected at the predetermined state, wherein the voltage value converted from the first signal by the conversion means is below a threshold voltage when the voice accessory is inserted into the connector; and a selection unit, responsive to the selection signal, for selectively establishing one of a first path and a second path, the first path coupling the first and the second terminals to the communication means, and the second path coupling the first and the second terminals to the voice module.

25. The mobile apparatus as recited in claim 24 wherein the processor sets the selection signal to a second state to allow the selection unit to establish the second path when the voltage value is below the threshold voltage to indicate that the first signal received is the voice data.

26. The mobile apparatus as recited in claim 25 wherein the voice module respectively transmits and receives the first and the second signals via the second path when the selection unit establishes the second path between the first and the second terminals and the voice module.

* * * * *